US 6,671,466 B1

(12) United States Patent
Banerjee et al.

(10) Patent No.: US 6,671,466 B1
(45) Date of Patent: Dec. 30, 2003

(54) DISTORTION COMPENSATION IN OPTICALLY AMPLIFIED LIGHTWAVE COMMUNICATION SYSTEMS

(75) Inventors: Sonali Banerjee, Eatontown, NJ (US); Atul Kumar Srivastava, Eatontown, NJ (US); James William Sulhoff, Ocean, NJ (US); Yan Sun, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/357,228

(22) Filed: Jul. 20, 1999

Related U.S. Application Data
(60) Provisional application No. 60/138,112, filed on Jun. 7, 1999.

(51) Int. Cl.[7] .................................................. H04J 14/02
(52) U.S. Cl. .......................... 398/79; 398/158; 398/192
(58) Field of Search ................................. 357/110, 124, 357/161, 179, 181, 174, 176, 177, 125, 134, 135, 341, 337.4; 398/136, 158, 168, 192, 79; 385/24

(56) References Cited

U.S. PATENT DOCUMENTS

| | | | | |
|---|---|---|---|---|
| 5,017,885 A | | 5/1991 | Saleh ........................... 330/4.3 |
| 5,050,949 A | * | 9/1991 | DiGiovanni et al. ......... 359/341 |
| 5,576,881 A | | 11/1996 | Doerr .......................... 359/333 |
| 5,745,283 A | | 4/1998 | Inagaki ........................ 359/341 |
| 5,861,980 A | | 1/1999 | Ono ............................. 359/341 |
| 5,900,968 A | | 5/1999 | Srivastava et al. ........... 359/341 |
| 5,907,420 A | | 5/1999 | Chraplyvy et al. .......... 359/179 |
| 6,031,659 A | * | 2/2000 | Okiyama ..................... 359/341 |
| 6,043,931 A | | 3/2000 | Jourdan et al. .............. 359/341 |
| 6,456,408 B1 | * | 9/2002 | Moeller ....................... 359/124 |
| 6,473,212 B1 | * | 10/2002 | Chraplyvy et al. .......... 359/124 |

FOREIGN PATENT DOCUMENTS

| | | | | |
|---|---|---|---|---|
| FR | 2 764 141 | 12/1998 | ............ H04B/10/12 |
| WO | WO 98 /27674 | 6/1998 | ............ H04B/10/17 |

OTHER PUBLICATIONS

X. Zhao et al, "Performance Analysis of Gain–Clamped Semiconductor Optical Amplifiers Using Different Clamping Schemes", *Conference Proceedings. LEOS '97, 10th Annual Meeting, IEEE Lasers and Electro–Optics Society 1997 Annual Meeing*, vol. 1, 1996, New York, NY, pp. 337–338.

J. C. Simon, et al., "Travelling wave semiconductor optical amplifier with reduced nonlinear distortions", *Electronics Letters*, vol. 30, No. 1, Jan. 6, 1994, pp. 49–50.

(List continued on next page.)

*Primary Examiner*—Brent A. Swarthout
(74) *Attorney, Agent, or Firm*—Gregory J. Murgia

(57) ABSTRACT

Distortion and crosstalk that occurs when operating optical amplifiers in saturation is substantially reduced by passively compensating for gain variations caused by changes in input power to the optical amplifiers. More specifically, in an optical communication system having one or more optical amplifiers, a "reservoir" optical channel is supplied in addition to the other traffic-carrying optical channels. The wavelength of the reservoir channel is selected such that the power level of the reservoir channel varies in response to changes in power levels of the traffic-carrying channels. Because gain variations are typically highest around the gain peak region in an optical amplifier's gain bandwidth, the reservoir channel in one exemplary embodiment is assigned a wavelength around the gain peak region. As such, the reservoir channel can absorb or otherwise receive most of the distortion and crosstalk while the traffic-carrying channels located away from the gain peak region will experience less distortion and crosstalk. -Importantly, this passive compensation scheme can be used in an amplified system which is operating in the presence of nonlinear distortions caused by gain variations, such as inter-modal distortion and saturation induced crosstalk.

20 Claims, 6 Drawing Sheets

OTHER PUBLICATIONS

L. F. Tiemeijer, et al., "Reduced Intermodulation Distortion in 133 nm Gain–Clamped MQW Laser Amplifiers", IEEE Photonics Technology Letters, vol. 7, No. 3, Mar. 1995, pp. 284–286.

C. R. Doerr, et al., "Elimination of Signal Distortion and Crosstalk from Carrier Density Changes in the Shared Semiconductor Amplifier of Multifrequency Signal Sources", IEEE Photonics Technology Letters, vol. 7, No. 10, Oct. 1995, pp. 1131–1133.

Kyo Inoue, "Crosstalk and Its Power Penalty in Multichannel Transmission due to Gain Saturation in a Semiconductor Laser Amplifier", Journal of Lightwave Technology, vol. 7, No. 7, Jul. 1989, pp. 1118–1123.

Adel A. M. Saleh, et al., "Effects of Semiconductor–Optical–Amplifier Nonlinearity on the Performance of High–Speed Intensity–Modulation Lightwave Systems", IEEE Transactions on Communications, vol. 38, No. 6, Jun. 1990, pp. 839–846.

P. Doussiere, et al., "Clamped Gain Travelling Wave Semiconductor Optical Amplifier for Wavelength Division Multiplexing Applications", $14^{th}$ IEEE International Semiconductor Laser Conference, Hyatt Regency Maui, Hawaii, Sep. 19–23, 1994, pp. 185–186.

Keang–Po Ho, et al., "Reduction of semiconductor laser amplifier induced distortion and crosstalk for WDM systems using light injection", Electronics Letters, vol. 32, No. 24, Nov. 21, 1996, pp. 2210–2211.

G. Grosskopf, et al., "Crosstalk In Optical Amplifiers For Two–Channel Transmission", Electronics Letters, vol. 22, No. 17, Aug. 14, 1986, pp. 900–901.

R. M. Jopson, et al., "Measurement Of Carrier–Density Mediated Intermodulation Distortion In An Optical Amplifier", Electronics Letters, vol. 23, No. 25, Dec. 3, 1987, pp. 1394–1395.

M. Bachmann, et al., "Polarisation–insensitive clamped–gain SOA with integrated spot–size convertor and DBR gratings for WDM applications at $1.55\mu$ wavelength", Electronics Letters, vol. 32, No. 22, Oct. 24, 1996, pp. 2076–2077.

G. Onishchukov, et al., "10 Gbit/s transmission over 1500km with semiconductor optical amplifiers", Electronics Letters, vol. 34, No. 16, Aug. 6, 1998, pp. 1597–1598.

Manabu Yoshino, et al., "Improvement of Saturation Output Power in a Semiconductor Laser Amplifier through Pumping Light Injection", IEEE Photonics Technology Letters, vol. 8, No. 1, Jan. 1996, pp. 58–59.

B. Bauer, et al., "Gain Stabilization of a Semiconductor Optical Amplifier by Distributed Feedback", IEEE Photonics Technology Letters, vol. 6, No. 2, Feb. 1994, pp. 182–185.

A. M. Saleh, et al., "Composition of Nonlinearity In Semiconductor Optical Amplifiers", Electronics Letters, vol. 24, No. 15, Jul. 21, 1988, pp. 950–952.

* cited by examiner

400

INPUT SPECTRUM

OUTPUT SPECTRUM

DISTORTION COMPENSATION IN OPTICALLY AMPLIFIED LIGHTWAVE COMMUNICATION SYSTEMS

CROSS-REFERENCE TO RELATED APPLICATIONS

This application claims the benefit of U.S. Provisional Application Serial No. 60/138,112 filed on Jun. 7, 1999. This application is related to co-pending and commonly assigned U.S. application Ser. No. 09/253,259 (Chraplyvy 27-13-15-22-14) filed on Feb. 19, 1999, now U.S. Pat. No. 6,473,212, which is incorporated by reference herein.

FIELD OF THE INVENTION

The invention relates generally to optical amplifiers and, more particularly, to lightwave systems and networks utilizing such amplifiers.

BACKGROUND OF THE INVENTION

Optical amplifiers are commonly used in lightwave communication systems as in-line amplifiers for boosting signal levels to compensate for losses in a transmission path, as power amplifiers for increasing transmitter power, and as pre-amplifiers for boosting signal levels before receivers. In wavelength division multiplexed (WDM) systems, which combine many optical channels at different wavelengths for transmission as a composite signal in an optical fiber, optical amplifiers are particularly useful because of their ability to amplify all channels simultaneously.

Erbium-doped fiber amplifiers are predominantly used in current WDM communication systems because of their gain characteristics and ease of coupling with optical fiber. Erbium-doped fiber amplifiers are particularly desirable for intensity modulated digital optical communication systems, wherein the light intensity of signal channels is modulated to represent the "1"s and "0"s of digital data. In particular, slow gain dynamics allow erbium-doped fiber amplifiers to provide constant gain to all signal channels in a WDM system regardless of bit transitions in the intensity modulated bit patterns. However, despite their usefulness in long haul transmission applications, the disadvantages of erbium-doped fiber amplifiers are well known. For example, erbium-doped fiber amplifiers are expensive and, as a result, do not provide the most cost effective solution for applications such as metropolitan optical networking and the like. Moreover, erbium-doped fiber amplifiers have a relatively narrow usable gain bandwidth which will become more of a problem in emerging long haul systems which have higher channel counts and which will use new optical fiber having a wider usable bandwidth.

By contrast, semiconductor optical amplifiers are comparatively inexpensive, have a large gain bandwidth, and can be easily integrated with other devices. However, semiconductor optical amplifiers have several limitations which have limited their use in optical communication systems to date. In particular, the fast gain dynamics and nonlinear gain characteristics of semiconductor optical amplifiers can be problematic. For example, gain changes quickly as input power changes and is not constant for the modulation speed of current communication systems, thus resulting in problems such as inter-modal distortion and saturation-induced crosstalk, i.e., cross-saturation.

Briefly, cross-saturation results when intensity modulation in one channel leads to modulation of the gain available for other channels. For example, the gain of a specific channel is saturated not only by its own power, but also by the power of the other channels in the system. Cross-saturation is particularly problematic in intensity modulated systems because the channel power changes with time depending on the bit pattern. The signal gain of one channel then changes from bit to bit, and the change depends on the bit patterns of the other channels. Such gain fluctuations can result in detection errors which degrade overall bit error rate performance.

Gain control schemes, such as feedforward or feedback gain control loops, gain clamping, and pump light injection schemes, have been proposed for reducing the effects of inter-modal distortion and cross-saturation. See, e.g., U.S. Pat. No. 5,017,885, entitled "*Optical Amplifier with Reduced Nonlinearity*", issued May 21, 1991 to A. Saleh, U.S. Pat. No. 5,576,881, entitled "*Multi-Frequency Optical Signal Source Having Reduced Distortion and Crosstalk*", issued Nov. 19, 1996 to Doerr et al., Simon et al., "*Travelling Wave Semiconductor Optical Amplifier with Reduced Nonlinear Distortions*", Electronics Letters, vol. 30, no. 1, January 1994, Tiemeijer et al., "*Reduced Intermodulation Distortion in 1300nm Gain-Clamped MQW Laser Amplifiers*", IEEE Photonics Technology Letters, vol. 7, no. 3, March 1995, and Yoshino et al., "*Improvement of Saturation Output Power in a Semiconductor Laser Amplifier Through Pumping Light Injection*", IEEE Photonics Technology Letters, vol. 8, January 1996, each of which is incorporated by reference herein. Among other disadvantages, these gain control schemes add cost and complexity to the system, e.g., because of additional circuitry for feedback or feedforward loops and the like.

Alternatively, inter-modal distortion and cross-saturation may be reduced by operating optical amplifiers in the small-signal region, i.e., unsaturated region. However, for practical applications, it is desirable to operate optical amplifiers in the saturation region to achieve high output power and other efficiencies. For example, WDM systems typically operate in the saturation region because of the high output power needed for wide dynamic range and high signal to noise ratios. Accordingly, inter-modal distortion and cross-saturation are still a problem for systems having optical amplifiers operating in the saturation region.

SUMMARY OF THE INVENTION

Distortion and crosstalk that occurs when operating optical amplifiers in saturation is substantially reduced according to the principles of the invention by passively compensating for gain variations caused by changes in input power to the optical amplifiers. More specifically, in an optical communication system having one or more optical amplifiers, passive gain control is achieved by supplying at least one optical channel in addition to the other traffic-carrying optical channels, wherein the additional optical channel absorbs or otherwise receives most of the gain variations while the traffic-carrying channels experience less.

Because optical channels having wavelengths near the gain peak region in an optical amplifier's gain bandwidth typically suffer the highest gain variations and are most susceptible to gain-induced crosstalk, the additional optical channel in one exemplary embodiment is assigned a wavelength at or near the gain peak region where the gain variations are at a maximum. By appropriate selection of wavelength and initial power of the additional optical channel, the power level in the additional optical channel rises and falls in response to changes in power levels of the traffic-carrying channels. As such, the additional optical channel serves as a "reservoir" channel that compensates for gain variations caused by changes in input power to the optical amplifier.

According to one exemplary embodiment, a wavelength division multiplexed (WDM) signal having a plurality of optical channels of respective wavelengths is amplified by one or more semiconductor optical amplifiers in a WDM system. A reservoir channel is inserted prior to the first semiconductor optical amplifier at a wavelength that is located at or near the point of maximum gain variation, e.g., typically the shorter wavelength region in the gain spectrum of the semiconductor optical amplifiers. As input power to the semiconductor optical amplifiers varies, e.g., as power levels in the incoming traffic-carrying WDM optical channels fluctuate, the gain variations in the semiconductor optical amplifiers will be highest where the reservoir channel is located. As such, the reservoir channel will experience the highest amount of gain variation and, as a result, will passively compensate for the distortion and crosstalk that would otherwise occur in the traffic-carrying optical channels.

Because effects of inter-modal distortion and cross-saturation are substantially reduced according to the principles of the invention, a system having optical amplifiers operating in saturation can therefore achieve substantial improvements in bit error rate performance as compared with prior art schemes. Moreover, because passive compensation is used instead of active feedback and feedforward control schemes as in the prior art, cost and complexity is substantially reduced. Consequently, such a solution can be readily implemented and advantageously used, especially in metropolitan area optical networking applications where cost is a primary consideration.

BRIEF DESCRIPTION OF THE DRAWING

A more complete understanding of the present invention may be obtained from consideration of the following detailed description of the invention in conjunction with the drawing in which:

FIGS. 5A–5B are plots of signal intensity as a function of wavelength for the signal channels and the reservoir compensation channel according to the principles of the invention, wherein FIG. 5A shows the input spectrum prior to a first optical amplifier in the transmission path and FIG. 5B shows the output spectrum after the last optical amplifier in the transmission path;

FIGS. 6A–6B are graphical plots in the form of eye diagrams showing the distribution of power and the cross-saturation effects thereon for WDM systems, wherein FIG. 6A shows an uncompensated signal and FIG. 6B shows a compensated signal according to the principles of the invention.

DETAILED DESCRIPTION OF THE INVENTION

Although the illustrative embodiments described herein are particularly well-suited for use in a wavelength division multiplexed system (WDM) comprising semiconductor optical amplifiers, and shall be described in this exemplary context, those skilled in the art will understand from the teachings herein that the principles of the invention may also be employed in conjunction with other types of optical communication systems and other types of optical amplifiers. For example, the principles of the invention can be applied to single channel optical communication systems and also to systems comprising other types of optical amplifiers having gain dynamics that give rise to the aforementioned problems. Furthermore, although the illustrative embodiments of the invention are described with reference to digital communications in which data is transmitted using bits "0" and "1", it will be appreciated that the inventive aspects are also applicable to other coding and modulation schemes. Accordingly, the embodiments shown and described herein are only meant to be illustrative and not limiting.

A brief review of gain-related problems in WDM systems is provided as a basis for understanding the principles of the invention. As is well known, optical amplifiers used for in-line amplification in WDM systems typically operate in the saturation region due to pumping efficiency and system considerations. In the saturation region, the output power of the amplifier is substantially fixed for a certain range of input power variations. As a result, the gain of the amplifier does not remain constant with the changes in input power. The output power of the amplifier must also be sufficiently high so that the signal to noise ratio at the receiver is high enough to permit accurate detection of the bit patterns transmitted in the intensity modulated signal.

Figure 1:
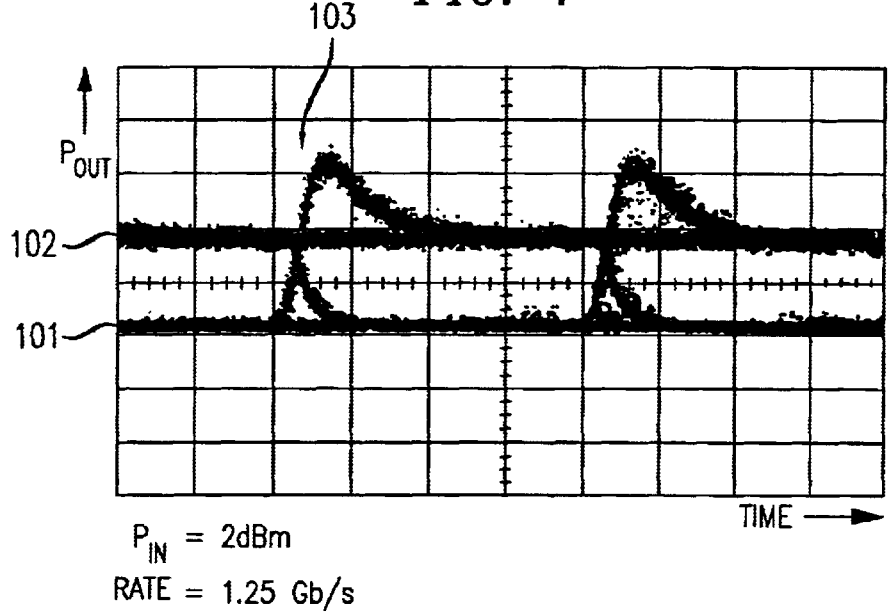
FIGS. 1–2 are graphical plots in the form of eye diagrams showing effects of inter-modal distortion, and cross-saturation, respectively, in a semiconductor optical amplifier-based system.

As noted previously, the inherent nonlinearity of semiconductor optical amplifiers can potentially degrade system performance. In particular, the nonlinear characteristics of semiconductor optical amplifiers gives rise to two very important and potentially harmful effects, inter-modal distortion and saturation induced crosstalk, i.e., cross-saturation. FIG. 1 is an eye diagram of a signal channel wherein the output power, $P_{OUT}$, exhibits inter-modal distortion. More specifically, power level 101 represents a steady state power level for a "0" bit and power level 102 represents a steady state power level of a "1" bit in the channel. When a transition from a "0" to "1" occurs in the transmitted bit pattern, represented here as transition point 103, the power level of the "1" bit actually exceeds the steady state value 102 for a certain period of time, thus resulting in gain fluctuations in the amplified signal. Consequently, this type of nonlinear distortion, which is dependent on the intensity modulation within the signal channel, can cause problems in the detection of bits, thus degrading the overall bit error rate performance of the system.

Figure 2:
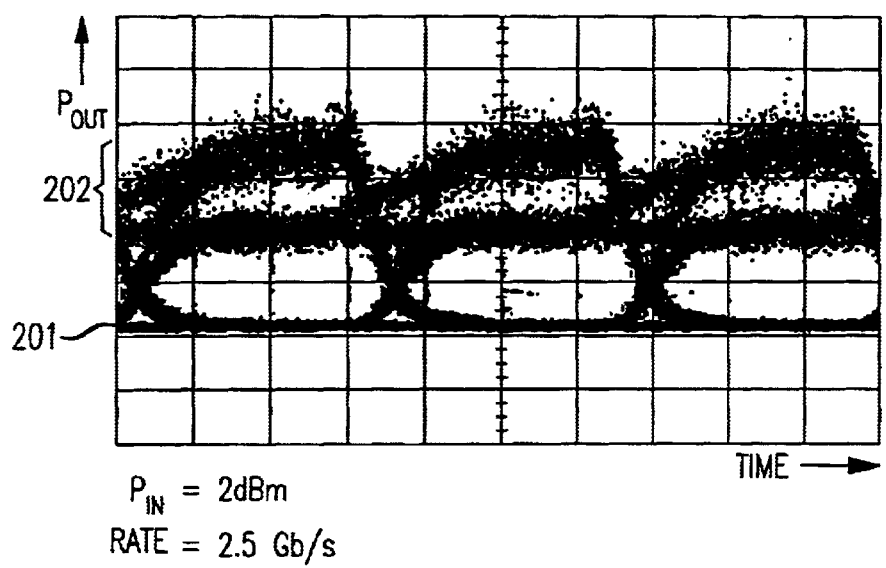

FIG. 2 is an eye diagram for one of the signal channels in a 2-channel system. It should be noted that a 2-channel system is shown for simplicity of illustration only. In this example, the output power $P_{OUT}$ in a signal channel depends on the state of the other channels through cross-saturation, which is the so-called crosstalk effect in WDM systems. In particular, the output power $P_{OUT}$ in one signal channel is affected by intensity modulation in the other channel in the system and will vary at random since each channel is independently modulated. As shown, power level 201 represents a power level for a "0" bit and power level 202 represents a range of power levels for a "1" bit in the channel. In particular, the power level of a "1" bit in the channel will vary according to the power level in the other channel of the system.

For example, if the other channel is transmitting a "0" bit, then the power level of a bit "1" in the channel shown in FIG. 2 will be at the higher end of range 202 since it will have substantially all of the total power in the system. Similarly, if the other channel is transmitting a "1" bit, then the power level of a bit "1" in the channel shown in FIG. 2 will be at the lower end of range 202 since the total power in the system will be shared between each of the channels. In sum, because the signal output for one channel fluctuates according to signal gain fluctuation induced by modulation in the other channels, this type of nonlinear distortion can cause problems in the detection of bits, thus degrading the overall bit error rate performance of the system.

In each of the foregoing examples, an input power of 2 dBm was used. Furthermore, a channel rate of 1.25 Gb/s was used in the example shown in FIG. 1 while a channel rate of 2.5 Gb/s was used in the example shown in FIG. 2. These parameters are meant to be illustrative only.

In systems employing erbium-doped fiber amplifiers, slow gain dynamics of the erbium-doped fiber amplifiers provide an advantage for modulation speeds of interest because the amplifier does not "respond" to the transitions in bits of "1"s and "0"s in the optical channels. Consequently, the erbium-doped fiber amplifier only sees the average power and therefore provides constant gain to the signal channels. As such, the gain of an erbium-doped fiber amplifier exhibits a linear characteristic such that inter-modal distortion and cross-saturation are not significant problems.

By contrast, the gain dynamics of a semiconductor optical amplifier are much faster than that of an erbium-doped fiber amplifier. In particular, the gain of a semiconductor optical amplifier changes rapidly as the input power changes and, as a result, the gain is not constant for the modulation speed of current communication systems. Thus, the gain of a semiconductor optical amplifier exhibits a nonlinear characteristic which causes the aforementioned problems of inter-modal distortion and cross-saturation which, in turn, can cause errors in the detection of bits transmitted within the channels of an optical communication system. Consequently, we have identified a need to solve the aforementioned problems so that semiconductor optical amplifiers can become a suitable alternative for single channel and WDM systems instead of the more expensive and bandwidth-limited erbium-doped fiber amplifiers.

According to the principles of the invention, a passive control technique is provided so that semiconductor optical amplifiers can be effectively used as in-line amplifiers in wavelength division multiplexed systems even in the presence of inter-modal distortion and cross-saturation. More specifically, we have discovered that substantially error-free transmission can be achieved in a WDM system employing semiconductor optical amplifiers by using an optical channel of a particular wavelength to perform a "reservoir" type function. This reservoir channel is used to share power along with the other optical channels in the WDM signal in response to input power changes to the amplifier and, by doing so, effectively regulates the gain variations that occur in a semiconductor optical amplifier as a result of inter-modal distortion and cross-saturation. In effect, the reservoir channel compensates for the aforementioned gain variations that occur as a result of changes in input power among the traffic-carrying optical channels, bit pattern transitions, crosstalk from other optical channels, and the like. Resulting gain variations in the semiconductor optical amplifier will therefore have less effect on the other optical channels in the WDM signal which carry traffic.

Figure 3:
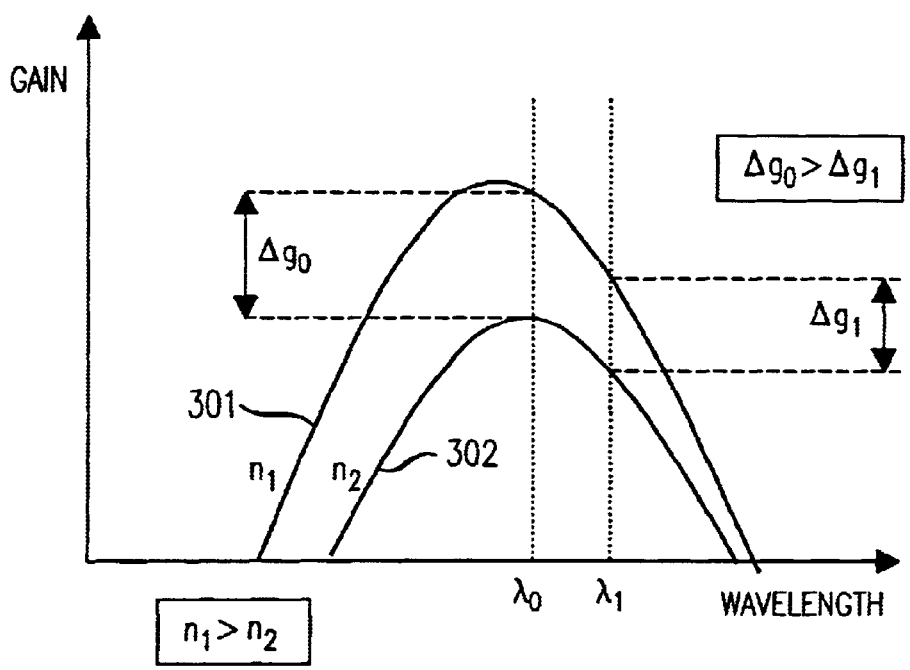
FIG. 3 is a graphical representation showing the gain spectra for a typical semiconductor optical amplifier.

A brief summary of the gain properties of semiconductor optical amplifiers will be helpful in understanding the selection of an appropriate wavelength for the reservoir channel which provides the passive compensation effect according to the principles of the invention. FIG. 3 shows the gain spectra, i.e., gain as a function of wavelength, at different carrier density levels n for a typical semiconductor gain medium. For simplicity of illustration and explanation, only two carrier density levels n are shown and described. As shown, the intrinsic gain of a semiconductor optical amplifier is not flat, so the gain peaks at a center wavelength and goes down on both sides of the gain peak.

More specifically, FIG. 3 shows two exemplary gain curves 301 and 302 corresponding to carrier density $n_1$ and $n_2$, respectively, where $n_1 > n_2$. As shown, a higher carrier density ngenerates higher gain as compared to a lower carrier density $n_2$. In general, carrier density n changes with changes in input optical power $P_{IN}$, assuming the pump current is fixed. As a result, the gain shape takes on different curves, e.g., 301 and 302 as shown in FIG. 3, depending on the input power and gain dynamics. Here we assume that, due to input power $P_{IN}$ fluctuations, the gain varies between curves 301 and 302. As will be described in more detail, these gain variations $\Delta g$ can result in the aforementioned problems of signal distortion and inter-channel or saturation-induced crosstalk. Gain variations are especially problematic for WDM systems in which input power $P_{IN}$ is typically not constant among the multiple adjacent wavelength channels.

In FIG. 3, gain variations $\Delta g_0$ and $\Delta g_1$ represent the gain shifts between gain curves 301 and 302 measured at wavelengths $\lambda_0$ and $\lambda_1$ respectively. It is clear from FIG. 3 that the gain variation is larger near the gain peak, i.e., highest point on the gain curves, such that $\Delta g_0 > \Delta g_1$. Moreover, FIG. 3 also illustrates how the gain variations as measured between gain curves 301 and 302 are larger in the shorter wavelength region than in the longer wavelength region, e.g., higher wavelengths. In particular, the distances between gain curves 301 and 302 are greater for the wavelengths on the left side of the gain peak than for wavelengths on the right side of the gain peak. Consequently, since $\lambda_1 > \lambda_0$ (i.e., $\lambda_0$ is the shorter wavelength and $\lambda_1$ is the longer wavelength), the gain variation is larger towards the shorter wavelength $\lambda_0$, which is also nearer to the gain peak. Accordingly, gain saturation is wavelength dependent, wherein saturation is stronger for wavelengths around the gain peak and progressively weaker for wavelengths located further away from the gain peak. As such, distortion and saturation-induced crosstalk are also wavelength dependent.

The wavelength of the reservoir channel is therefore selected such that the power level of the reservoir channel varies in response to a change in power level of one or more of the other optical channels in the WDM signal. As previously described, optical channels having wavelengths near the gain peak of the semiconductor optical amplifier, i.e., the high gain region, tend to suffer the highest gain variations and are most susceptible to gain-induced crosstalk. Consequently, we have found the reservoir channel to be most effective when located in the shorter wavelength region at or near the point of maximum gain variation in the gain spectrum, e.g., at or near the gain peak. Accordingly, it is desirable to locate the traffic-carrying optical channels in the longer wavelength region.

Referring again to FIG. 3, the reservoir channel can be assigned at or near the region having a large amount of gain variation, e.g., wavelength $\lambda_0$, while the traffic-carrying channels can be assigned wavelengths further from the gain peak, e.g., wavelength $\lambda_1$ and so on. It should be noted that other system design parameters may affect the selection of wavelength assignments. For example, while traffic-carrying channels may be located further from the gain peak according to the principles of the invention, the wavelength assignments will also depend on where the channels can still experience sufficient gain as required in the system. In certain system configurations, it may also be necessary to use wavelengths in the vicinity of the high gain region for traffic-carrying optical channels. In this case, it would be desirable to assign wavelengths near the high gain region only for those signals which can tolerate more quality degradation than others, such as those with low data rate or short transmission distance.

The following example describes an experiment performed to demonstrate the principles of the invention described above. In general, parameters were selected to be representative of a metropolitan area network. However, it should be noted that the various arrangements, devices, materials, dimensions, parameters, operating conditions, etc., are provided by way of illustration only and are not intended to limit the scope of the invention.

EXAMPLE

Figure 4:
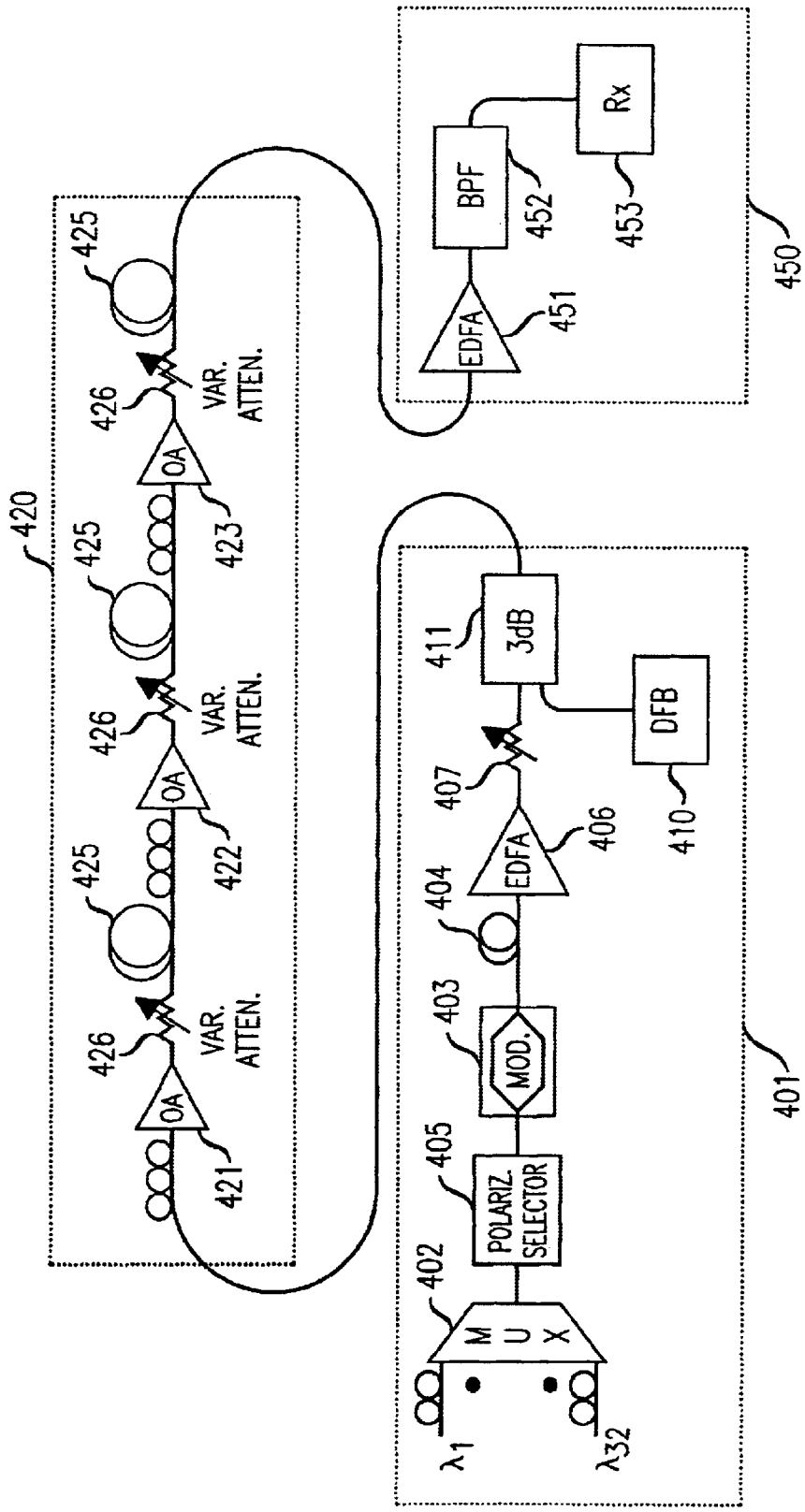
FIG. 4 is a simplified schematic showing an exemplary embodiment of a WDM system in which the principles of the invention may be applied.

More specifically, FIG. 4 shows an experimental system configuration for confirming the principles of the invention. In this exemplary configuration and experiment, wavelength division multiplexed system 400 includes a transmitter portion 401, a transmission section 420, and a receiver portion 450. In transmitter portion 401, waveguide router (multiplexer) 402 was used to combine 32 signal channels (N=32) supplied by external cavity lasers (ECLs) (not shown) with wavelengths ranging from 1534.95 nm to 1559.36 nm with a channel spacing of 100 GHz. All channels were modulated with LiNbO$_3$ modulator 403 and subsequently decorolated with dispersion compensating fiber (DCF) 404. The data rate was 2.5 Gb/s for each of the channels with a pseudo-random bit sequence (PRBS) of $2^{31}-1$. Polarization selector 405, erbium doped fiber amplifier 406, and optical attenuator 407 were also used in transmitter portion 401 according to well-known techniques and principles of operation.

The reservoir channel was added using a laser source, e.g., distributed feedback laser (DFB) 410, and a coupler, e.g., 3 dB coupler 411, before the first semiconductor optical amplifier 421 in transmission section 420. It should be noted that the use of distributed feedback laser 410 and 3 dB coupler 411 are only meant to be illustrative and not limiting in any way. Accordingly, other means for transmitting an optical channel, e.g., other well-known laser sources and couplers, will be apparent to those skilled in the art and are contemplated by the teachings herein. In transmission section 420, three spans of standard single mode transmission fiber 425 are each preceded with a respective semiconductor optical amplifier 421–423. Commercially available single stage semiconductor optical amplifiers without gain control were used for the experiment. Other type semiconductor optical amplifiers may also be used in conjunction with the teachings of the invention.

The small signal gain of semiconductor optical amplifiers 421–423 was approximately 20 dB when pumped at 400 mA. For each of amplifiers 421–423 operating under strong saturation in this experiment, the total input power was maintained at about −3 dBm, the gain was 15 dB (which is about 5 dB below the small-signal gain), and the output power was about 12 dBm. Each transmission fiber span 425 was between 41 and 42 km in length with around 9 dB loss per span. A variable attenuator 426 was placed after each semiconductor optical amplifier 421–423, respectively, to achieve a total span loss of about 15 dB.

At receiver portion 450, erbium doped fiber amplifier 451 was used as a pre-amplifier. Band-pass-filter 452 was used to select one channel at a time for appropriate measurement, e.g., BER and eye measurement. Detector/receiver 453 was used to detect bits in the 32 channels.

Figure 5A:
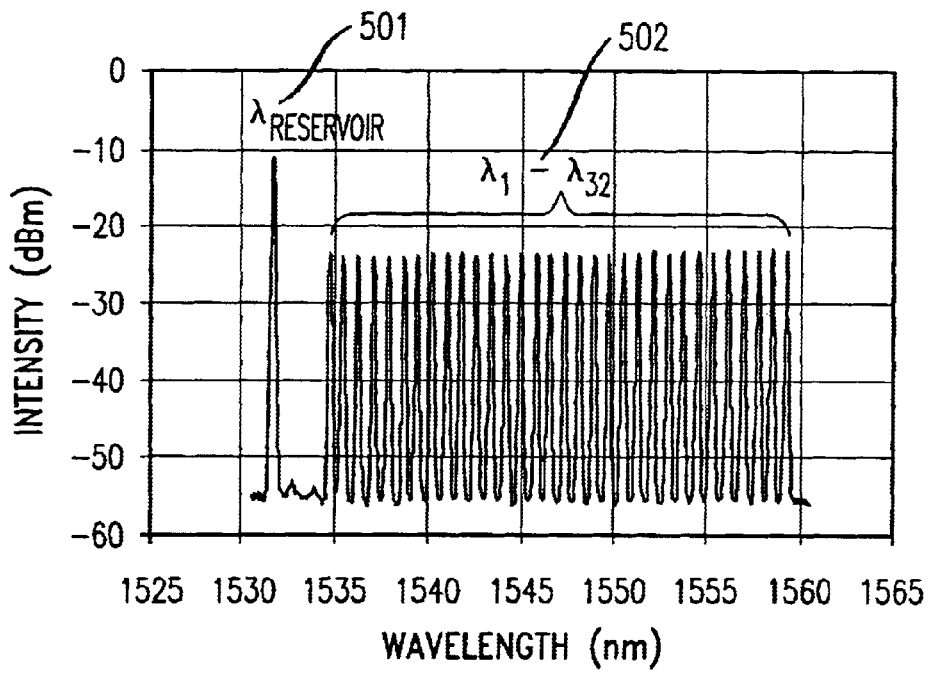
Figure 5B:
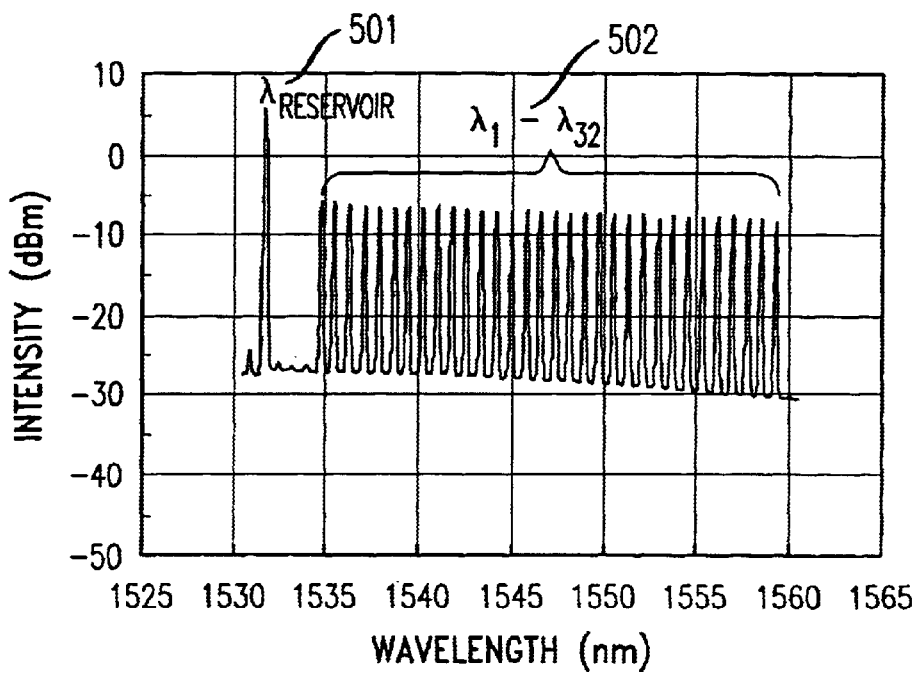

FIGS. 5A and 5B illustrate the wavelength assignments of reservoir channel 501, shown here as $\lambda_R$, and traffic-carrying optical channels 502 of the WM signal, shown here as $\lambda_1-\lambda_{32}$, which were used in the experimental configuration shown in FIG. 4. More specifically, the power spectrum at the input end of a transmission section (i.e., prior to semiconductor optical amplifier 421) is shown in FIG. 5A and the power spectrum at the output end of the transmission section (e.g., after semiconductor optical amplifier 423) is shown in FIG. 5B. Reservoir channel 501 is located in the signal band or gain spectrum of the optical amplifier to reduce gain variations. As previously indicated, reservoir channel 501 should have a wavelength in the gain spectrum where gain variations or fluctuations are at or near a maximum to be most effective. In particular, since gain variations in a semiconductor optical amplifier are higher in the shorter wavelengths (as shown in FIG. 3), reservoir channel 501 should be located at the shorter wavelength region of the signal spectrum instead of the longer wavelength region. In the exemplary embodiments shown in FIGS. 5A and 5B, the wavelength for reservoir channel 501 was selected to be about 1531.78 nm, while the traffic carrying optical channels 502 were in the wavelength range of 1534.95 nm to 1559.36 nm. It should be noted that this wavelength assignment is only meant to be illustrative and not limiting in any way.

As will be described in more detail below, the initial power level, e.g., launched power, of reservoir channel 501 is also an important consideration. In general, the initial power level of reservoir channel 501 should be higher than that of the traffic-carrying optical channels 502 because reservoir channel 501 must be able to share power with the other optical channels according to changes in input power. It should be noted that other well-known factors may need to be considered in selecting an appropriate power level for reservoir channel 501. For example, if the power level for reservoir channel 501 is too high, then other system impairments, e.g., power-dependent optical impairments such as Stimulated Brillioun Scattering (SBS) and the like, may degrade system performance. Moreover, there is a certain amount of tradeoff in that supplying a reservoir channel results in less power being available for the other optical channels. Accordingly, selection of the appropriate power level for reservoir channel 501 will depend on several parameters. In the example shown in FIGS. 5A–5B, the power in reservoir channel 501 is approximately 12 dB to 13 dB higher than that of a traffic-carrying optical channel 502 at the input, e.g., approximately four times as much power in reservoir channel 501 than in a traffic carrying optical channel 502.

In operation, reservoir channel 501 serves as a passive compensation mechanism by which gain variations in traffic-carrying optical channels can be substantially reduced. More specifically, by selecting an appropriate wavelength for reservoir channel 501 around the gain peak region of the amplifier and an appropriate power level, gain variations resulting from fluctuations in power at the input to the optical amplifier (e.g., by adding or dropping traffic-carrying channels, changes in bit patterns in the channels, etc.) will be suppressed. For example, when total input power to the amplifier decreases, e.g., lower than an expected level, the output power in the surviving traffic-carrying channels would typically fluctuate (i.e., increase) as a result of gain variations within the amplifier. However, in this scenario, the power in reservoir channel 501 will rise to offset the power increments that would otherwise occur in the surviving traffic-carrying channels. Conversely, when total input power increases, e.g., higher than an expected level, the output power in the surviving traffic-carrying channels would typically decrease. However, the power in reservoir channel 501 in this situation will fall so that power in the surviving traffic-carrying channels will not be decreased. Accordingly, reservoir channel 501 is a passive compensation channel for sharing power with the traffic-carrying channels as the power levels of the traffic-carrying channels fluctuate.

To gain a further understanding of the operation of a reservoir channel according to the principles of the invention, consider a simplified example of a system which includes four traffic-carrying channels each capable of being intensity-modulated with bits of "0"s and "1"s. In these examples, assume that changes in input power are a result of bit pattern changes in the channels. As previously described, changes can also occur as a result of adding/dropping channels.

In the first scenario in which a reservoir channel is not used, changes in input power will cause the aforementioned fluctuations in traffic-carrying channels as a result of gain variations. For example, when all channels are carrying a bit "1", the total power P is distributed among each of the channels so that each channel has approximately ¼ of the power P. When three of the channels carry a bit "1" and one channel carries a bit "0", then the total power P is distributed among the three channels carrying a bit "1" such that each channel has approximately ⅓ of the power P. Similarly, when two channels carry a bit "1" and two channels carry a bit "0", each channel with a bit "1" has approximately ½ of the power P. Finally, when three channels carry a bit "0" and one channel carries a bit "1", the one channel with bit "1" will have all the power P. As is well known, a fluctuation from ½ of P to P represents a 3 dB change in power which is significant. Consequently, power fluctuations can be quite large in this scenario.

By incorporating a reservoir channel around the gain peak of the amplifier gain spectrum according to the principles of the invention, power fluctuations are substantially reduced. Continuing with the exemplary configuration shown and described in FIGS. 4 and 5A–5B, the power level of the reservoir channel is initially four times that of a traffic-carrying channel, e.g., approximately 12–13 dB higher. So, for this example, the reservoir channel initially has approximately the same power as all four traffic-carrying channels combined.

Given this initial power level for the reservoir channel, when all traffic-carrying channels are carrying a bit "1", total power P is distributed among each of the traffic-carrying channels and the reservoir channel so that each of the four traffic-carrying channels has approximately ⅛ of the power P while the reservoir channel has the remaining ½ of power P (e.g., four times the power). When three of the traffic-carrying channels carry a bit "1" and one channel carries a bit "0", then the total power P is distributed among the three channels carrying a bit "1" and the reservoir channel such that each channel with a bit "1" has approximately ⅐ of the power P and the reservoir channel has the remaining power. In particular, the power level of the reservoir channel rises to compensate for one less traffic-carrying channel being available (e.g., the channel now carrying a "0" bit) to otherwise share the power. Similarly, when two channels carry a bit "1" and two channels carry a bit "0", each channel with a bit "1" has approximately ⅙ of the power P while the reservoir channel has the remaining power. Here, the power level of the reservoir channel rises to compensate for two less traffic-carrying channels being available to otherwise share the power. Finally, when three channels carry a bit "0" and one channel carries a bit "1", the one channel with bit "1" has approximately ⅕ of the power P while the remaining power is in the reservoir channel. Here, the power level of the reservoir channel rises to compensate for three less traffic-carrying channels being available to otherwise share the power.

As compared with the example without a reservoir channel, it becomes clear that the sharing of power in the reservoir channel reduces the magnitude of the power fluctuations in the traffic-carrying channels. In particular, the fluctuations without the reservoir channel are much steeper, e.g., on the order of 1 to ½ to ⅓, and so on. By contrast, by including the reservoir channel at four times the power of a traffic-carrying channel, the fluctuations are much more gradual in the traffic-carrying channels, e.g., ⅕ to ⅙ to ⅐ and so on.

Because the reservoir channel is supplied along with the traffic-carrying channels at the input to the amplifier, the reservoir channel passively compensates for power fluctuations in the other optical channels by sharing power based on input power changes. As such, the principles of the invention can be applied without any active feedback or feedforward circuitry as used in the active control schemes of the prior art. Accordingly, the reservoir channel is a low cost, less complex, but highly effective scheme in compensating for input power fluctuations as compared to prior arrangements.

It should also be noted that the reservoir channel can be either unmodulated or modulated to carry out some additional functions as desired. For example, the reservoir channel may be modulated to perform a particular function, e.g., compensating for optical nonlinearities such as power-dependent Stimulated Brillioun Scattering (SBS). The reservoir channel could also be used as a telemetry channel for carrying control or supervisory information to manage the system or components in the system. Other uses of a modulated reservoir channel will be apparent to those skilled in the art.

Figure 6A:
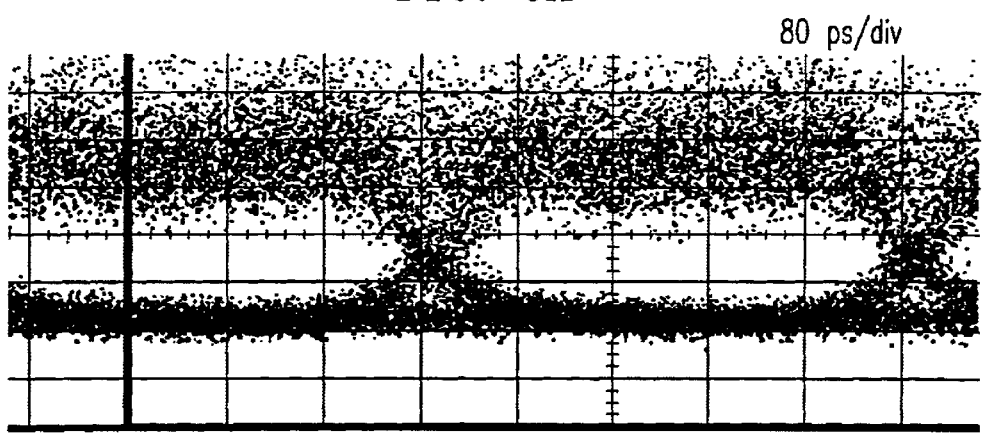
Figure 6B:
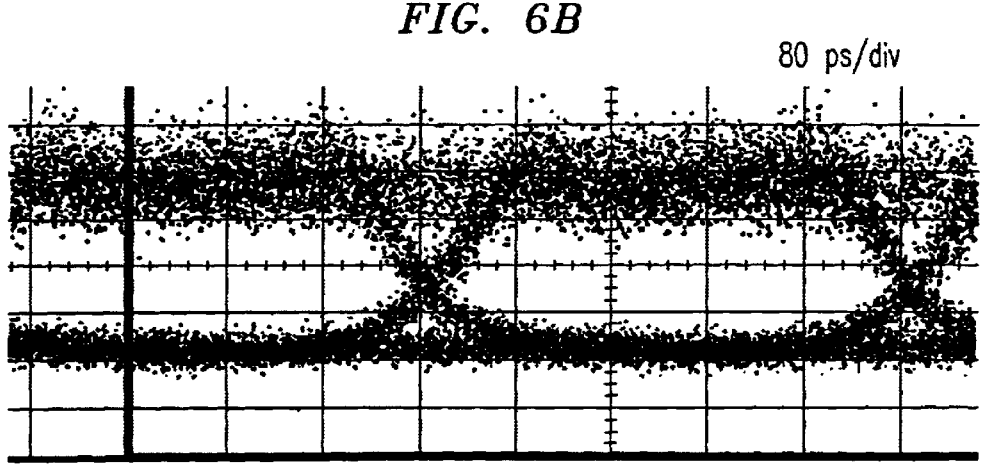

The comparison of the system performance without the reservoir channel and with the reservoir channel can be seen in FIGS. 6A–6B, respectively. More specifically, FIGS. 6A–6B show the eye-diagrams for a representative channel. As shown in FIG. 6A, the distortion is clearly greater (e.g., more eye closure) than when using a reservoir channel as shown in FIG. 6B. FIG. 6B shows the eye being open for all channels at the detector when using a reservoir channel.

Figure 7:
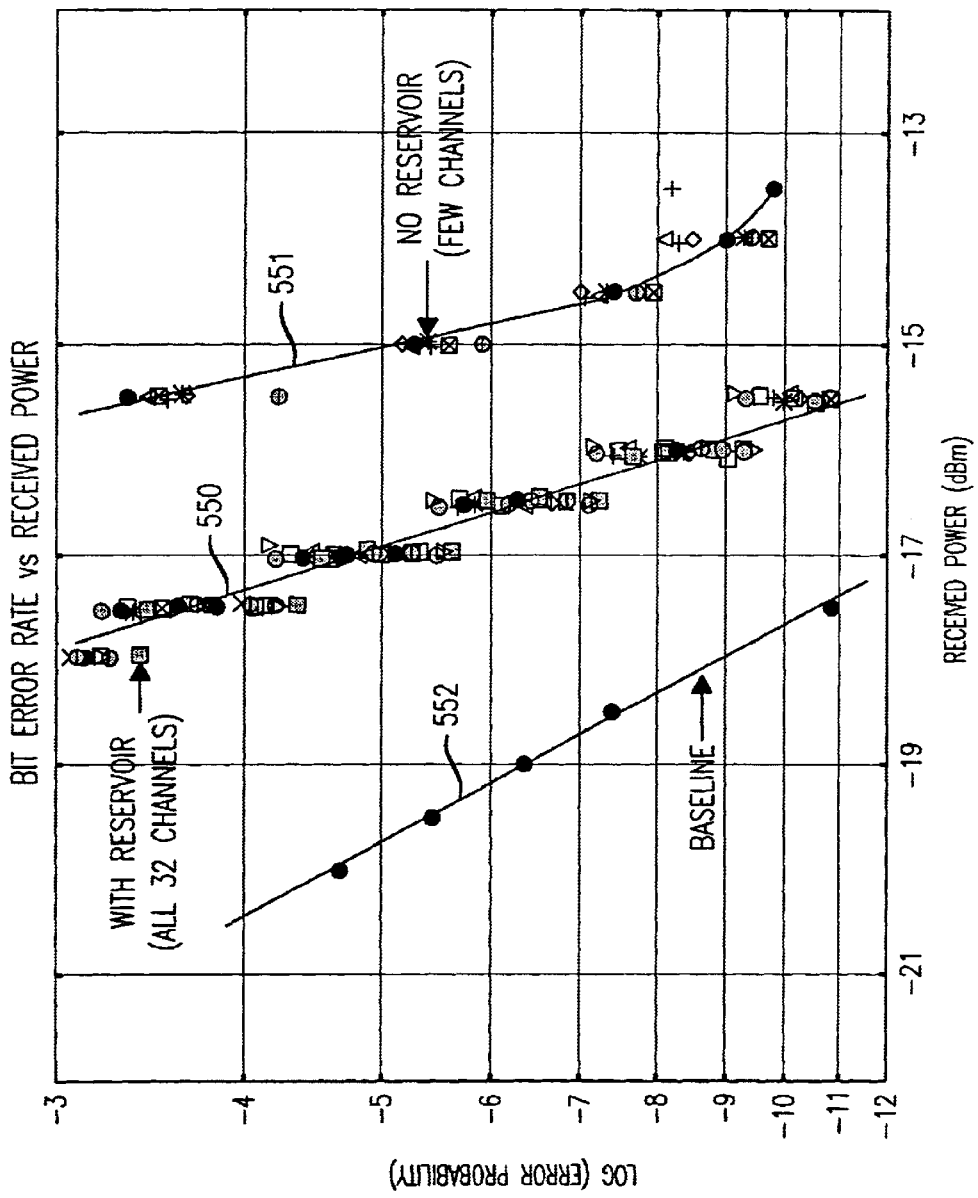
FIG. 7 shows bit error rate measurements corresponding to an experimental demonstration of the principles of the invention using the system configuration of FIG. 4.

The bit error rate (BER) measurement data for signal transmissions in the exemplary configuration in FIG. 4 are shown in FIG. 7. In each of curves 550–552, a solid line has been drawn through the various data points to serve as a visual aid. As shown, curve 552 represents a baseline curve for bit error rate performance for signals transmitted from transmitter portion 401 to receiver portion 450 but not passing through transmission section 420 of exemplary system 400 in FIG. 4. As such, curve 552 shows bit error rate performance without the inter-modal distortion and cross-saturation effects from semiconductor optical amplifiers 421–423. As illustrated by the measurements at or near reference curve 550, substantially error-free transmission for all 32 channels was achieved using the reservoir channel with about a 1 dB to 2 dB penalty. Without a reservoir channel, the penalty is higher as shown for a few representative channels illustrated by measurements along curve 551. Curve 551 illustrates an important point that, as received power increases, the BER reaches a point at which no further reduction in BER can be realized. Accordingly, a comparison between curves 550 (with reservoir channel) and 551 (without reservoir channel) clearly illustrates that BER performance can be substantially improved using the reservoir channel.

It should also be noted that in the above discussions, it was assumed that the semiconductor optical amplifiers operate under strong saturation conditions. If the amplifier is operated under less saturation or even in the linear region, the distortion and crosstalk will be less.

The principles of the invention are particularly useful in WDM systems employing cascaded semiconductor optical amplifiers operated under saturation. In multi-span systems with cascaded semiconductor optical amplifiers, for example, power fluctuations will depend on several factors. One such factor is dispersion in the transmission fiber which can cause relative shifts in the bits of different signal channels, e.g., the bits in different channels may travel at different speeds causing the bits to shift relative to each other. For systems with less dispersion, power fluctuations should decrease as the signals propagate further along in the system. In systems with higher dispersion, however, relative shifts in the bits of different optical channels can cause further fluctuations in the input power at downstream semiconductor optical amplifiers. In addition to well-known dispersion compensation techniques, the principles of the invention may also be used in these cascaded amplifier arrangements to control dispersion-related power fluctuations.

There are other parameters of semiconductor optical amplifiers that may need to be addressed in conjunction with the teachings of the invention depending on the particular application. For example, the noise figure for semiconductor optical amplifiers (e.g., typically 6 dB or higher) and the output power (e.g., typically 15 dBm or lower) may need to be addressed with other complementary techniques for long haul applications. Furthermore, other techniques may be used for addressing some of the other nonlinear effects of fiber-based systems, such as four-wave-mixing, self-phase-modulation, and cross-phase-modulation, to name a few. In sum, the principles of the invention address the saturation induced crosstalk effects which have prevented widespread use of semiconductor optical amplifiers in WDM applications. With these problems solved, the principles of the invention can therefore be readily applied to provide a low cost solution for WDM transmission, such as in metropolitan applications and the like.

As previously noted, numerous gain control schemes have been studied for erbium-doped fiber amplifiers and other types of amplifiers and lasers, such as link control and pump control. In these methods, the gain or total power is monitored and then the information is used to actively control the control channel or pump. All these schemes can still be used with semiconductor optical amplifier-based systems which employ the reservoir channel according to the principles of the invention. For example, the monitoring wavelength used in these schemes should be located at or near the gain peak region (e.g., to monitor the most sensitive point). Similarly, the control channel should also be located in the gain peak region to be most effective, e.g., to effectively alter $P_{IN}$ of the reservoir channel to maintain constant $P_{OUT}$.

Moreover, the passive compensation provided by the reservoir channel according to the principles of the invention can also complement other techniques for improving the bit error rate performance of an optically amplified system. For example, the reservoir channel can be used in conjunction with the technique described in co-pending U.S. patent application Ser. No. 09/253,259 (Chraplyvy 27-13-15-22-14), which is incorporated by reference herein in its entirety, wherein the detection threshold level of the system is adjusted to achieve more accurate detection even in the presence of inter-modal distortion and crosstalk.

The foregoing is merely illustrative of the principles of the invention. Those skilled in the art will be able to devise numerous arrangements, which, although not explicitly shown or described herein, nevertheless embody principles that are within the spirit and scope of the invention. For example, although many of the embodiments shown and described herein were directed toward in-line amplifier applications, the principles of the invention can also be applied in applications where optical amplifiers are used as power amplifiers after transmitters or as pre-amplifiers before receivers in either single channel optical communication systems or wavelength division multiplexed systems. Furthermore, the inventive principles described herein are applicable for semiconductor optical amplifiers as well as any type of optical amplifier in which the gain dynamics, coupled with other factors, may give rise to the aforementioned gain-related problems. These other factors could include, for example, the transmission rates of the signals being amplified (e.g., high data rates). Accordingly, the scope of the invention is limited only by the claims that follow.

We claim:

1. A method of operating an optical communication system including at least one optical amplifier for amplifying a first optical signal in an optical communication path, the method comprising:

introducing a second optical signal into the optical communication path, the second optical signal having a wavelength selected to be approximately in a region of maximum gain variation in a gain spectrum of the at least one optical amplifier, such that the power level of the second optical signal varies in response to a change in power level of the first optical signal to passively compensate for gain variations caused by the change in lower level of the first optical signal, whereby impairments caused by the gain variations are reduced in the first optical signal.

2. The method according to claim 1, wherein the second optical signal has an initial power level of approximately four times the power level of the first optical signal.

3. The method according to claim 1, wherein the at least one optical amplifier comprises a semiconductor optical amplifier.

4. The method according to claim 1, wherein the optical communication system is a wavelength division multiplexed (WDM) system and the first optical signal is a WDM signal having a plurality of optical channels of respective wavelengths in the gain spectrum of the at least one optical amplifier.

5. The method according to claim 4 wherein, when input power levels of one or more of the plurality of optical channels decreases, the power level of the second optical signal increases so that variations in the power levels of other ones of the plurality of optical channels are reduced, and when input power levels of one or more of the plurality of optical channels increases, the power level of the second optical signal decreases so that variations in the power levels of other ones of the plurality of optical channels are reduced.

6. The method according to claim 4, wherein the wavelength of the second optical signal is in a shorter wavelength region of the gain spectrum relative to the wavelengths of the plurality of optical channels in the WDM signal.

7. The method according to claim 4, wherein the plurality of optical channels are intensity modulated for transmitting bits of digital data.

8. The method according to claim 7, wherein the power level in one of the plurality of optical channels varies as a function of both intensity modulation In that channel and intensity modulation in other ones of the plurality of optical channels, wherein the variations are representative of saturation induced crosstalk.

9. The method according to claim 8, wherein the wavelength and initial power level of the second optical signal is selected such that gain saturation effect is greater in the second optical signal than the first optical signal.

10. The method according to claim 7, wherein the power level in one of the plurality of optical channels varies as a function of intensity modulation in that channel, wherein the variations are representative of inter-modal distortion.

11. A method of compensating for gain variations in an optical communication system having at least one optical amplifier, wherein at least one optical channel of a first wavelength in a gain spectrum is amplified by the at least one optical amplifier, the method CHARACTERIZED BY:

supplying a second optical channel of a second wavelength for amplification by me at least one optical amplifier, the second wavelength being selected to be approximately within a region of maximum gain variation in the gain spectrum so that the power level of the second optical channel varies in response to a change in power level of the first optical channel to passively compensate for gain variations caused by the change in power level of the first channel, whereby impairments caused by the gain variations are reduced in the first optical channel.

12. The method according to claim 11, wherein the at least one optical amplifier comprises a semiconductor optical amplifier.

13. A method of compensating for gain variations in a wavelength division multiplexed (WOM) system having a plurality of optical amplifiers, wherein a WDM signal having a plurality of optical channels of respective wavelengths in a gain spectrum is amplified by the plurality of optical amplifiers, the method comprising:

supplying an optical channel of a selected wavelength for amplification by the plurality of optical amplifiers, the selected wavelength being approximately within a region of maximum pin variation of the gain spectrum so that the power level of the optical channel of the selected wavelength varies in response to a change in power level of one or more of the plurality of optical channels to passively compensate for gain variations caused by the channel in power level in the amplified WDM signal.

14. The method according to claim 13, wherein the plurality of optical amplifiers include one or more semiconductor optical amplifiers.

15. The method according to claim 13, wherein the optical channels in the amplified WDM signal are intensity modulated for transmitting bits of digital data.

16. The method according to claim 15, wherein the power level in one of the plurality of optical channels varies as a function of both intensity modulation in that channel and intensity modulation in other ones of the plurality of optical channels, wherein the variations are representative of saturation induced crosstalk.

17. An optical communication system including at least one optical amplifier for amplifying a first optical signal in an optical communication path, the system CHARACTERIZED BY:

an optical transmitter for transmitting a second optical signal in the optical communication path, the second optical signal having a wavelength selected to be approximately within a region of maximum gain variation in a gain spectrum of the at least one optical amplifier such that the power level of the second optical signal varies in response to a change in power level of the first optical signal to passively compensate for gain variations caused by the chance in power level of the first optical signal, whereby impairments caused by the gain variations are reduced in the first optical signal.

18. The system according to claim 17, wherein the at least one optical amplifier comprises a semiconductor optical amplifier.

19. The system according to claim 17, wherein the optical communication system is a wavelength division multiplexed (WDM) system and the first optical signal is a WDM signal having a plurality of optical channels of respective wavelengths in the gain spectrum.

20. An apparatus for compensating for gain variations in an optical communication system having at least one optical amplifier, wherein at least one optical signal of a first wavelength in a gain spectrum is amplified by the at least one optical amplifier, the apparatus comprising:

an optical transmitter for supplying a second optical signal of a second wavelength for amplification by the at least one optical amplifier, the second wavelength being selected to be approximately within a region of maximum gain variation in the gain spectrum of the at least one optical amplifier so that the power level of the second optical signal varies in response to a change in power level of the first optical signal to passively compensate for gain variations caused by the change in power level of the first optical signal.

* * * * *

UNITED STATES PATENT AND TRADEMARK OFFICE
CERTIFICATE OF CORRECTION

PATENT NO. : 6,671,466 B1
DATED : December 30, 2003
INVENTOR(S) : S. Banerjee et al.

It is certified that error appears in the above-identified patent and that said Letters Patent is hereby corrected as shown below:

Column 12,
Line 51, delete "lower" and substitute therefor -- power --.

Column 13,
Line 18, delete "In" and substitute therefor -- in --;
Line 36, delete "me" and substitute therefor -- the --;
Line 50, delete "(WOM)" and substitute therefor -- (WDM) --;
Line 58, delete "pin" and substitute therefor -- gain --.

Column 14,
Line 5, delete "channel" and substitute therefor -- change --;
Line 31, delete "chance" and substitute therefor -- change --.

Signed and Sealed this

Twenty-ninth Day of November, 2005

JON W. DUDAS
*Director of the United States Patent and Trademark Office*